(12) United States Patent
Bogoni et al.

(10) Patent No.: US 7,869,053 B2
(45) Date of Patent: Jan. 11, 2011

(54) HIGH TEMPORAL RESOLUTION OPTICAL SAMPLER AND SAMPLING METHOD

(75) Inventors: Antonella Bogoni, Mantova (IT); Luca Poti, Pisa (IT); Filippo Ponzini, Bedonia (IT)

(73) Assignee: Ericsson AB, Stockholm (SE)

( * ) Notice: Subject to any disclaimer, the term of this patent is extended or adjusted under 35 U.S.C. 154(b) by 673 days.

(21) Appl. No.: 10/571,235

(22) PCT Filed: Sep. 6, 2004

(86) PCT No.: PCT/EP2004/052058

§ 371 (c)(1), (2), (4) Date: Sep. 8, 2008

(87) PCT Pub. No.: WO2005/024363

PCT Pub. Date: Mar. 17, 2005

(65) Prior Publication Data

US 2009/0001963 A1    Jan. 1, 2009

(30) Foreign Application Priority Data

Sep. 9, 2003 (IT) .......................... MI2003A1726

(51) Int. Cl.
*G01B 9/02* (2006.01)
(52) U.S. Cl. ...................................... 356/480
(58) Field of Classification Search ................. 356/480
See application file for complete search history.

(56) References Cited

FOREIGN PATENT DOCUMENTS

| EP | 1 271 114 A2 | 1/2003 |
|---|---|---|
| GB | 2 245 715 A | 1/1992 |
| JP | 2003-014548 A | 1/2003 |

OTHER PUBLICATIONS

Runser et al. "A Practical All-Optical Sampling Technique for High Bandwidth, Low Energy Optical Communication Signals" IEEE, vol. 2, Nov. 13, 2000, pp. 770-771.*

*A Practical All-Optical Sampling Technique for High Bandwidth, Low Energy Optical Communication Signals*, R. J. Runser, et al., 2000, Piscataway, NJ, IEEE, vol. 2, Nov. 13, 2000, pp. 770-771/.

*Single-Shot Optical Sampling Oscilloscope for Ultrafast Optical Waveforms*, IEEE Photonics Technology Letters, K-L Deng, et al., New York, vol. 10, No. 3, Mar. 1, 1998.

(Continued)

*Primary Examiner*—Patrick J Connolly
(74) *Attorney, Agent, or Firm*—Kirschstein, et al.

(57) ABSTRACT

An optical sampler with high temporal resolution comprises a TOAD device with a loop optical path at the inlet of which is input an optical signal to be sampled and along which path is arranged a point of input of an optical control signal produced by a source and appropriately delayed by a delay line to change on command the temporal position of the TOAD transmittance window compared to the signal to be sampled. In the loop there is also a nonlinear device. The sampler includes a controller to command the delay line to move step by step the transmittance window and make it run on the signal to be sampled. The mean power transmitted at the TOAD output is measured for each window position and a derivative on the mean powers found for each window position is performed, thus finding samples representing the optical signal.

11 Claims, 1 Drawing Sheet

OTHER PUBLICATIONS

Figure 1:
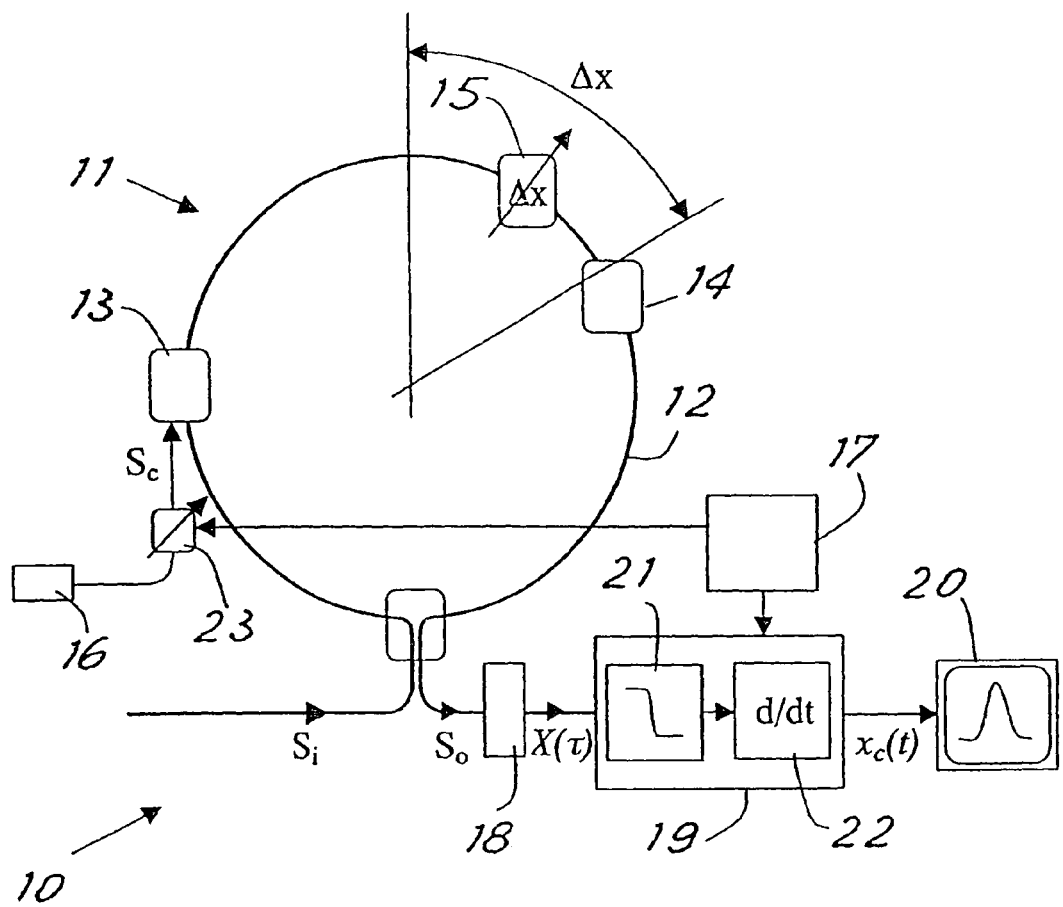

*A Single-Shot Measurement of a Picosecond Optical Pulse Waveform*, Procedings of the SPIE, SPIE, Bellingham, VA, R. Koga, et all, vol. 236, Sep. 23, 1980, pp. 373, 375.

New Optical Sampler Based on TOAD and Data Postprocessing for Subpicosecond Pulse Resolution, Antonella Bogoni, et al., IEEE Journal of Selected Topics in Quantum Electronics, vol. 10, No. 1, Jan./Feb. 2004, pp. 186-191.

Numerical Implementation of Sagnac Loop Terahertz Asymmetric Optical Demultiplexer for OTDM Systems, A. A. Pereira, Jr., et al., Proceesings SBMO/IEEE MTT-S IMOC 2003, pp. 657-660.

* cited by examiner

HIGH TEMPORAL RESOLUTION OPTICAL SAMPLER AND SAMPLING METHOD

The present invention relates to a sampling method and a low-cost, simple and stable optical sampler with high temporal resolution. In particular, the sampler can easily reach a resolution of a few hundred femtoseconds with a very simple scheme. The sampler is thus suited to evaluation of the shape of pulses with duration on the order of picoseconds and even less.

In recent years, interest in the use of ultra-short optical pulses has increased because of the requirement for high bit-rate transmission systems and characterization of the dynamics of many ultra-fast nonlinear optical devices has increased.

To seek to satisfy the need for analysis of optical signals beneath the temporal resolution limit of modern oscilloscopes, optical samplers have been proposed. Different optical sampling techniques have been proposed but they are generally costly and very complex or they have stability and temporal resolution limitations. In particular, it is very difficult to reach temporal resolutions on the order of magnitude of the picosecond or less.

The general purpose of the present invention is to remedy the above-mentioned shortcomings by making available a sampling method and a low cost, simple and stable optical sampler with high temporal resolution on the order of a few hundred femtoseconds.

In view of this purpose it was sought to provide in accordance with the present invention a high temporal resolution optical sampler comprising a TOAD device with a loop optical path at the input of which is fed in an optical signal to be sampled $S_i$ of duration $T_p$ and along which path is arranged a point of input of an optical control signal $S_c$ produced by a source and appropriately delayed compared to the signal to be sampled by means of a delay line (23) to change on command the temporal position of the TOAD transmittance window compared to the signal to be sampled with there also being in the loop a nonlinear device (14) and there are also control means to command the delay line to move step by step said transmittance window of a duration T greater than $T_p$ in a temporal interval at least equal to the duration $T_p$ of the signal to be sampled to run on it and means of measurement for measuring the mean power transmitted at the TOAD output for each position of the window and means of processing which execute the derivative on said temporal interval of the mean powers measured and thus obtaining samples representative of the signal $S_i$ input.

Again in accordance with the present invention it was sought to realize a sampling method with high temporal resolution sampling method of an optical signal $S_i$ comprising the steps of applying the signal $S_i$ to a TOAD device having a transmittance window of duration T greater than the signal $S_i$ to be sampled and moving the transmittance window step by step in a temporal interval at least equal to the duration $T_p$ of the signal to be sampled to run thereon and measure the mean power transmitted at the output of the TOAD device for each window position and execute the derivative on said temporal interval of the mean measured powers to obtain samples representative of the entered signal.

Figure 2:
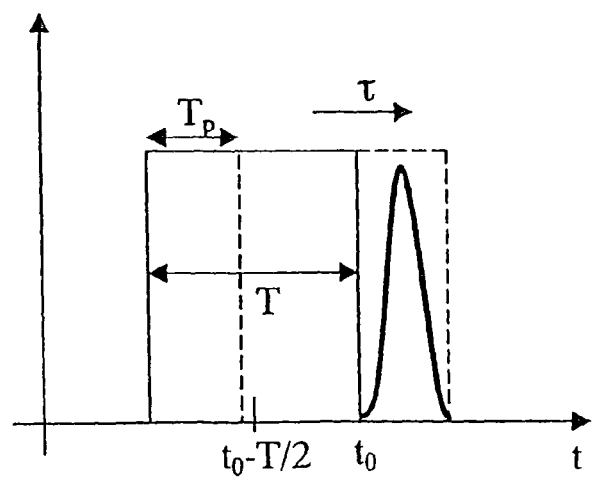

To clarify the explanation of the innovative principles of the present invention and its advantages compared with the prior art there is described below with the aid of the annexed drawings a possible embodiment thereof by way of non-limiting example applying said principles. In the drawings:

FIG. 1 shows a block diagram of an optical sampler realized in accordance with the present invention, and FIG. 2 shows a graph of the operating principal of the sampler of FIG. 1.

With reference to the figures, FIG. 1 shows designated generally by reference number 10 an optical sampler in accordance with the present invention. The optical sampler 10 is based on a Terabit Optical Asymmetric Demultiplexer (TOAD) 11. For this reason the sampler will be called here TOS (TOAD-based Optical Sampler).

The TOAD is a known device based on the Sagnac interferometric principle and is used in the prior art to demultiplex composite signals, i.e. extract a desired optical channel from a plurality of optical channels mutually temporally multiplexed. This function is however totally unused in the sampler in accordance with the present invention.

The TOAD, as shown in FIG. 1, consists of a loop reflection path 12 with a coupler 13 (type 2×2) and a nonlinear member 14 both arranged along the loop. Advantageously the nonlinear member 14 is thrown out of phase by a distance $\Delta x$ from the median point of the loop. A check pulse $S_c$ is produced by an appropriate known source 16 and is injected into the loop 12.

In the prior art, TOAD devices were proposed for fast demultiplexing operations in Optical Time Division Multiplexing (OTDM) systems because, through a control pulse inserted in the loop through the coupler, they permit opening a transmittance window whose temporal duration depends only on the distance $\Delta x$. Indeed, the control pulse saturates the nonlinear member so that if two counterpropagating signal components pass through the device respectively before and after the control pulse, they undergo different phase modulation. On the contrary, they are affected by a same phase modulation.

These two different conditions permit obtaining two different transmission values towards the outlet of the interferometric structure, i.e. at the end of the loop opposite that of input of the signal to be demultiplexed. The structure and operating principles of a TOAD will not be shown here or described in detail as they are well known to those skilled in the art.

By decreasing the distance $\Delta x$ the relative delay between the intersection times of the two counterpropagating signals can be reduced and consequently the temporal length of the transmission window is shortened.

Distance $\Delta x$ can be changed by means of a known variable optical delay line 15 inserted in the loop.

The rise and fall times of the beginning and ending fronts of the transmittance window depend on the nonlinear member 14. For the use in accordance with the present invention it was found advantageous to use a known Semiconductor Optical Amplifier (SOA) as the nonlinear member. In this case, indeed, the beginning and ending fronts of the window depend on the saturation time of the SOA and the duration of the control pulse. Appropriately optimizing the control signal power level to reduce the TOAD transmittance window transition time, the basic limit becomes only the SOA saturation time which is a few hundred femtoseconds.

As known, a sampling process requires an ultra-short temporal window compared to the amplitude of the pulse to be reproduced. As just said, the rising and falling fronts do not constitute a problem as they can be obtained sufficiently steep. The minimum duration of the window is however limited by the nonlinear member propagation time which is greater than or at least comparable to the duration of the signals it is desired to sample. This is sufficient for conventional use of the demultiplexers for which the TOAD is ordinarily used. But it is not at all acceptable for use as a sampler.

In accordance with the principles of the present invention the TOAD was found useable as a sampler even though considering an amplitude of the transmittance window broader than the entire pulse to be sampled on condition that it be sufficiently narrow to reject adjacent pulses. Appropriate pulse duration adjustment can be done manually by means of the delay line 15.

Indeed, by moving the window above an appropriate interval in time, it was found possible to realize an integration of the signal pulse. Indeed, as may be seen in FIG. 2, by moving the window step by step by an amount $\tau$ in a time interval equal to the entire duration $T_p$ of the pulse to be sampled, from the central instant $t_0-T/2$ and measuring the mean power transmitted at the outlet for each position of the window the following function is found:

$$X(\tau)=k\int x(t)dt$$

where x(t) is the individual pulse shape function and k is a constant.

Correct movement of the window depending on the signal to be measured is found by controlling appropriately by means of a known control device 17 a delay line 23 arranged to delay the control signal compared to the signal to be sampled. The functions of the known control device 17 and the processing unit 19 are carried out by a PC (not shown). Using LABVIEW™ software the PC imparts a desired delay to the delay line 23. The PC then measures the delay which has been implemented by the delay line 23 to verify that it is correct before indicating to the processing unit 19 when to acquire the data. This process is iterated until the delay which has been implemented is substantially equal to the desired delay. Once the desired delay has been attained the control device 17 then authorises the processing unit 19 to proceed and to perform the data filtering at 21 and to obtain the derivative at 22.

The mean power $X(\tau)$ of the signal is found by an appropriate known means or power measurer 18 arranged at the outlet of the TOAD and which advantageously supplies sampled results in numerical form for subsequent processing.

To find samples representative of the shape of the individual pulse being tested it is sufficient to derive the curve $X(\tau)$ at the outlet of the measurer. Resolution is limited only by transition time of the transmittance window and by the resolution of the optical delay line which moves the control pulses compared to the signal in order to find the temporal running of the window.

The signal $X(\tau)$ is therefore sent to a processing unit 19 which performs the derivative of the incoming signal to then send its result to a display unit 20 for example.

A time discrete derivative is simple to find and is defined as:

$$\sideset{_1}{_k^N}{\forall} d_k = \frac{a_k - a_{k-1}}{\Delta t}$$

where $d_k$ is the derivative sequence, $a_k$ (with k from 0 to N) the filtered sequence, N+1 the number of data samples and $\Delta t$ the temporal delay between two adjacent samples.

In comparison with fiber-based interferometric structures, TOAD has many advantages such as a higher temporal stability and insensitivity to polarization if an SOA independent of polarization is used. Moreover, transition and transmittance times can be significantly lower than control pulse amplitude.

To sum up, the physical limit of the sampling process realized in accordance with the present invention depends only on transmittance window rising time and consequently resolution is fixed by SOA saturation time and therefore pulses with duration of less than a picosecond and resolution of a few hundred femtoseconds can be sampled. This is achieved without the need for ultra-short optical sampling pulses.

As may be seen again in FIG. 1, to increase the quality of the result it was found advantageous for the processing unit 19 to include a low-pass filter 21 before the derivative calculation means 22.

The filtering operation eliminates noise arising from instability of the laser source and polarization residue dependent upon the particular SOA used.

The data acquired, which represent integration of the pulse shape, can have not negligible fluctuations because of the measurement inaccuracies, source instability, pulse jitters et cetera. Moreover, any use of a SOA dependent on polarization produces an increase in data fluctuations acquired because of polarization variations. These fluctuations compromise the derivation operations in time. However, the high-frequency nature of the noise contribution permits eliminating these measurement degradation factors effectively by low-pass filtering.

From the experimental tests it was shown that efficiency in noise reduction is independent of the filter form and in practice depends only on its amplitude. Naturally, the filter band must be optimized to reduce the above-mentioned fluctuations without influencing the information.

For efficient noise rejection it was found advantageous to use a Butterworth low-pass filter of the first order having a cutting frequency from 2% to 10% of the frequency of the data sample sequence. In particular, a figure around 5% of the data sample sequence frequency was found advantageous. After the filtering operation the data can be derived to find the pulse shape.

It is now clear that the predetermined purposes have been achieved by making available a simple and reliable sampler permitting accurate sampling of ultra-short pulses. Comparative tests among the results obtainable with a sampler in accordance with the present invention and known samplers of undoubtedly higher cost and complexity made clear the excellent performance of the sampler in accordance with the present invention.

Naturally the above description of an embodiment applying the innovative principles of the present invention is given by way of non-limiting example of said principles within the scope of the exclusive right claimed here. For example, in addition to being used to display the shape of the sampled signal, the sample data can be used for any other desired purpose and also further processed. Naturally, the visualization obtained can be of other magnitudes representing the entering signal and not only of its amplitude in time.

The invention claimed is:

1. An optical sampler with high temporal resolution, comprising: a terabit optical asymmetric demultiplexer (TOAD) device including a loop optical path having an input for inputting an optical signal to be sampled, the optical signal having a duration, a source for generating an optical control signal and for inputting the control signal to the optical path, a delay line for delaying the control signal to change a temporal position of a transmittance window, and control means in the optical path; measurement means for measuring a mean power at an output of the optical path for each window position; delay control means for controlling the delay line to move step-by-step the transmittance window having a window duration greater than the duration of the optical signal in a temporal interval at least equal to the duration of the optical signal; and processing means for performing a derivative on the temporal interval of the mean powers measured to thus obtain data samples representing the optical signal.

2. The sampler in accordance with claim 1, in that the processing means is operative for performing a discrete derivative in time on a sequence of data samples representing the mean powers for each window position, the derivative being defined as:

where $d_k$ is the derived sequence, $a_k$ (with k from 0 to N) is the data sample sequence incoming to the processing means, N+1 is the number of data samples and $\Delta t$ is the temporal delay between two adjacent samples.

3. The sampler in accordance with claim 1, in that the processing means includes a low-pass filter for filtering the measured mean powers before the derivative is performed.

4. The sampler in accordance with claim 3, in that the low-pass filter performs a numerical filtering on a sequence of the data samples representing the mean powers for each window position.

5. The sampler in accordance with claim 4, in that the low-pass filter is a Butterworth low-pass filter of a first order with a cutoff frequency from 2% to 10% of a frequency of the sequence of the data samples.

6. The sampler in accordance with claim 5, in that the cutoff frequency is around 5% of the frequency of the sequence of the data samples.

7. The sampler in accordance with claim 1, and additional means for receiving samples representative of the optical signal, and for processing and displaying a graph representing magnitudes of the optical signal.

8. The sampler in accordance with claim 1, in that the control means is an SOA amplifier.

9. The sampler in accordance with claim 1, in that a variable delay line for modifying the transmittance window is provided in the optical path upstream of the control means.

10. A high temporal resolution sampling method for an optical signal, comprising the steps of:
   a) applying the optical signal to a terabit optical asymmetric demultiplexer (TOAD) device having a transmittance window of a window duration greater than a duration of the optical signal to be sampled;
   b) measuring a mean power transmitted at an output of the TOAD device for each window position;
   c) moving the transmittance window step-by-step in a temporal interval equal at least to the duration of the optical signal to be sampled; and
   d) performing a derivative on the temporal interval of the mean powers measured to obtain data samples representative of the optical signal.

11. The method in accordance with claim 10, and the additional step of performing a low-pass filtering on the measured data samples before performing the derivative.

* * * * *